(12) United States Patent
Nagao et al.

(10) Patent No.: US 9,850,351 B2
(45) Date of Patent: Dec. 26, 2017

(54) POLYCARBONATE-POLYORGANOSILOXANE COPOLYMER AND METHOD FOR CONTINUOUSLY PRODUCING SAME

(71) Applicant: IDEMITSU KOSAN CO., LTD., Chiyoda-ku (JP)

(72) Inventors: Yukiko Nagao, Ichihara (JP); Yasuhiro Ishikawa, Ichihara (JP); Hiroaki Motegi, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/151,742

(22) Filed: May 11, 2016

(65) Prior Publication Data

US 2016/0257790 A1    Sep. 8, 2016

Related U.S. Application Data

(63) Continuation of application No. 14/411,275, filed as application No. PCT/JP2013/067574 on Jun. 26, 2013, now Pat. No. 9,371,419.

(30) Foreign Application Priority Data

Jul. 5, 2012  (JP) ................. 2012-151903

(51) Int. Cl.
*C08G 77/448* (2006.01)
*C08G 64/18* (2006.01)
*C08G 64/22* (2006.01)
*C08L 83/10* (2006.01)
*C08G 64/24* (2006.01)
*C08G 64/40* (2006.01)
*C08G 77/38* (2006.01)
C08G 77/34 (2006.01)
C08G 77/16 (2006.01)

(52) U.S. Cl.
CPC ......... *C08G 77/448* (2013.01); *C08G 64/186* (2013.01); *C08G 64/22* (2013.01); *C08G 64/24* (2013.01); *C08G 64/406* (2013.01); *C08G 77/38* (2013.01); *C08L 83/10* (2013.01); *C08G 77/16* (2013.01); *C08G 77/34* (2013.01)

(58) Field of Classification Search
None
See application file for complete search history.

(56) References Cited

U.S. PATENT DOCUMENTS

| 4,839,458 | A | 6/1989 | Koga et al. |
| 6,008,315 | A | 12/1999 | Kimura et al. |
| 6,252,013 | B1 | 6/2001 | Banach et al. |
| 6,476,249 | B1 | 11/2002 | Ito |
| 6,930,202 | B1 | 8/2005 | Heuser et al. |
| 8,962,780 | B2 * | 2/2015 | Higaki .............. C08G 64/186 525/464 |
| 2003/0027928 | A1 | 2/2003 | Okamoto et al. |

(Continued)

FOREIGN PATENT DOCUMENTS

| EP | 2 277 936 | 1/2011 |
| JP | 63 268736 | 11/1988 |

(Continued)

OTHER PUBLICATIONS

Machine translation of JP 2005-023124 (no date).*

(Continued)

*Primary Examiner* — Marc Zimmer
(74) *Attorney, Agent, or Firm* — Oblon, McClelland, Maier & Neustadt, L.L.P.

(57) ABSTRACT

Provided are a polycarbonate-polyorganosiloxane copolymer having a carbon tetrachloride concentration of less than 4 ppm by mass, and the following production method for producing the polycarbonate-polyorganosiloxane copolymer. More specifically, provided is a method of continuously producing a polycarbonate-polyorganosiloxane copolymer, the method comprising the steps of: (A) continuously or intermittently taking a polymerization reaction liquid, which is obtained by polymerizing a dihydric phenol compound, a carbonate precursor, and a specific polyorganosiloxane in the presence of an alkaline compound aqueous solution and a water-insoluble organic solvent, out of a reactor; (B) separating the polymerization reaction liquid taken out in the step (A) into an aqueous phase and a water-insoluble organic solvent phase; (C) washing the water-insoluble organic solvent phase separated in the step (B), followed by separation thereof into an aqueous phase and a water-insoluble organic solvent phase; (D) concentrating the water-insoluble organic solvent phase separated in the step (C); and (E) recovering part or all of the water-insoluble organic solvent removed by evaporation in the step (D), followed by distillation purification thereof in a distillation column, the water-insoluble organic solvent obtained in the step (E) being reused as at least part of the water-insoluble organic solvent in the step (A) or as an extraction solvent for the aqueous phase separated in the step (B), or as both thereof, in the step (E), the distillation purification being performed while a concentration of the polycarbonate-polyorganosiloxane copolymer in a column bottom liquid of the distillation column is controlled to 6% by mass or less.

6 Claims, 1 Drawing Sheet

(56) References Cited

U.S. PATENT DOCUMENTS

2012/0157653 A1 6/2012 König et al.
2012/0271009 A1 10/2012 Higaki et al.
2014/0256888 A1 9/2014 Ishikawa et al.

FOREIGN PATENT DOCUMENTS

| JP | 6 100684 | | 4/1994 |
|---|---|---|---|
| JP | 06-174945 | * | 6/1994 |
| JP | 6 329781 | | 11/1994 |
| JP | 8 157206 | | 6/1996 |
| JP | 11 180920 | | 7/1999 |
| JP | 2000 302962 | | 10/2000 |
| JP | 2002 284977 | | 10/2002 |
| JP | 2003 524031 | | 8/2003 |
| JP | 2005-023124 | * | 1/2005 |
| JP | 2007 112845 | | 5/2007 |
| JP | 2009 132756 | | 6/2009 |
| JP | 2009 285533 | | 12/2009 |
| WO | 00 18822 | | 4/2000 |
| WO | WO 2011/013846 | * | 2/2011 |
| WO | 2013 080816 | | 6/2013 |

OTHER PUBLICATIONS

Machine translation of JP 6-174945 (no date).*
International Search Report dated Aug. 27, 2013 in PCT/JP13/067574 Filed Jun. 26, 2013.
Extended European Search Report dated Jan. 15, 2016, in corresponding European Patent Application No. 13 81 2542.
Communication pursuant to Rule 114(2) EPC dated Oct. 12, 2016 in European Patent Application No. 13812542.2.

* cited by examiner

POLYCARBONATE-POLYORGANOSILOXANE COPOLYMER AND METHOD FOR CONTINUOUSLY PRODUCING SAME

CROSS REFERENCE TO RELATED APPLICATIONS

This application is a continuation of U.S. patent application Ser. No. 14/411,275, filed Dec. 24, 2014; which is a 371 of PCT/JP13/67574, filed Jun. 26, 2013, the disclosures of which are incorporated herein by reference in their entireties. This application claims priority to Japanese Patent Application No. 2012-151903, filed Jul. 5, 2012, the disclosure of which is incorporated herein by reference in its entirety.

TECHNICAL FIELD

The present invention relates to a polycarbonate-polyorganosiloxane copolymer and a method of continuously producing the copolymer, and more specifically, to a method of continuously producing a polycarbonate-polyorganosiloxane copolymer by interfacial polymerization method.

BACKGROUND ART

A polycarbonate-based resin is a polymer excellent in transparency, heat resistance, and impact resistance and is widely used at present as an engineering plastic in the industrial field.

As a method of producing the polycarbonate-based resin, a method involving allowing an aromatic dihydroxy compound such as bisphenol A, and phosgene to react directly with each other (interfacial polymerization method) is known as a method of producing a high-quality polycarbonate.

As a method of industrially producing a polycarbonate by interfacial polymerization method, there is adopted a method involving bubbling phosgene into an alkali aqueous solution of a bisphenol to form a polycarbonate oligomer having a reactive chloroformate group, and further allowing a condensation reaction (polymerization reaction) of the polycarbonate oligomer and the bisphenol to proceed in the presence of a polymerization catalyst such as a tertiary amine, and an alkali aqueous solution simultaneously with or successively after the formation of the polycarbonate oligomer. From the viewpoints of solubility, handling properties, and the like, methylene chloride is mainly used as a water-insoluble organic solvent on an industrial scale.

The methylene chloride used in the reaction step is generally recovered and then reused for the reaction step (see Patent Document 1). In addition, waste water after the polymerization reaction, waste water formed after a washing step, and waste water formed after a granulation step contain an inorganic material such as sodium chloride and an organic material such as a phenol and a polycarbonate. In order to remove such organic material from the aqueous phase and clean the waste water, the organic material is extracted and removed from the waste water by using an organic solvent, preferably the same water-insoluble organic solvent as that used in the polycarbonate production step, such as methylene chloride. The water-insoluble organic solvent containing the extracted and removed phenol and polymer is reused for the polymerization reaction step (see Patent Document 2).

In addition, in production of phosgene in the method of producing the polycarbonate-based resin, carbon tetrachloride ($CCl_4$) is produced as a by-product and carbon tetrachloride is gradually accumulated in a reactor by cyclic use of methylene chloride. Accordingly, a concentration of carbon tetrachloride in the polycarbonate-based resin to be produced increases. The concentration of carbon tetrachloride in the polycarbonate-based resin is preferably suppressed to a low level because carbon tetrachloride is responsible for deterioration in color tone of the polycarbonate-based resin and corrosion of a die. As a method of suppressing the concentration of carbon tetrachloride in the polycarbonate-based resin to a low level, there has been known a method involving producing phosgene with a catalyst layer diluted with a material substantially inert to carbon monoxide and chlorine to reduce an amount of carbon tetrachloride to be produced as a by-product at the time of the production of phosgene (see Patent Document 3), or a method involving purifying circulating methylene chloride by distillation in the production of the polycarbonate-based resin (see Patent Document 4).

It should be noted that, among the polycarbonate-based resins, a polycarbonate-polyorganosiloxane polymer (hereinafter sometimes referred to as "PC-POS") has been attracting attention because of its high impact resistance, high chemical resistance, and high flame retardancy, and the polymer has been expected to find utilization in a wide variety of fields such as the field of electrical and electronic equipment and the field of an automobile. As a method of producing the PC-POS, there is known a method involving allowing a dihydric phenol-based compound and phosgene to react with each other to produce a polycarbonate oligomer, and polymerizing the polycarbonate oligomer with a polyorganosiloxane in the presence of methylene chloride, an alkaline compound aqueous solution, a dihydric phenol-based compound, and a polymerization catalyst (see Patent Document 5).

CITATION LIST

Patent Document

[Patent Document 1] JP 2009-132756 A
[Patent Document 2] JP 2009-285533 A
[Patent Document 3] JP 08-157206 A
[Patent Document 4] JP 63-268736 A
[Patent Document 5] JP 06-329781 A

SUMMARY OF INVENTION

Technical Problem

The method described in Patent Document 3 and the method described in Patent Document 4 are each preferably adopted in the production of the PC-POS as well. However, studies made by the inventors of the present invention have found the following. When the distillation of methylene chloride is performed, a reboiler at the bottom portion of a distillation column causes a heat transfer failure owing to the foaming of methylene chloride, and hence stable driving of the distillation column cannot be performed in some cases. In addition, even when a flash drum is used, the discharge pressure of a circulating pump at the bottom portion of the flash drum may be destabilized. As a result, unlike the production of a normal polycarbonate-based resin, the concentration of carbon tetrachloride tends to increase and hence it is difficult to continuously produce a PC-POS having a carbon tetrachloride concentration of less than 4 ppm by mass in an industrially stable manner.

In view of the foregoing, an object of the present invention is to provide a polycarbonate-polyorganosiloxane copolymer (PC-POS) having a carbon tetrachloride concentration of less than 4 ppm by mass and a method of continuously producing the PC-POS in an industrially stable manner.

Solution to Problem

The inventors of the present invention have made extensive studies, and as a result, have found that when the concentration of a PC-POS included in a column bottom liquid at the bottom portion of a distillation column exceeds a predetermined value upon distillation of methylene chloride for reuse, the foaming of methylene chloride occurs to cause the problem.

In view of the foregoing, the inventors have found that when the concentration of the PC-POS included in the column bottom liquid is controlled to a value equal to or less than the predetermined value by, for example, taking the column bottom liquid out of the bottom portion of the column at the time of the distillation, the foaming of methylene chloride is suppressed and its distillation purification can be efficiently performed, and by extension, a PC-POS having a carbon tetrachloride concentration of less than 4 ppm by mass can be continuously produced in an industrially stable manner.

That is, the present invention relates to the following items [1] to [9].

[1] A polycarbonate-polyorganosiloxane copolymer, having a carbon tetrachloride concentration of less than 4 ppm by mass.

[2] The polycarbonate-polyorganosiloxane copolymer according to the item [1], in which the copolymer has a viscosity-average molecular weight of 10,000 to 30,000.

[3] A method of continuously producing the polycarbonate-polyorganosiloxane copolymer according to the item [1] or [2], the method comprising the steps of:

(A) continuously or intermittently taking a polymerization reaction liquid, which is obtained by polymerizing a dihydric phenol compound represented by the following general formula (1), a carbonate precursor, and a polyorganosiloxane represented by the following general formula (2) in the presence of an alkaline compound aqueous solution and a water-insoluble organic solvent, out of a reactor;

(B) separating the polymerization reaction liquid taken out in the step (A) into an aqueous phase and a water-insoluble organic solvent phase;

(C) washing the water-insoluble organic solvent phase separated in the step (B), followed by separation thereof into an aqueous phase and a water-insoluble organic solvent phase;

(D) concentrating the water-insoluble organic solvent phase separated in the step (C); and

(E) recovering part or all of the water-insoluble organic solvent removed by evaporation in the step (D), followed by distillation purification thereof in a distillation column, the water-insoluble organic solvent obtained in the step (E) being reused as at least part of the water-insoluble organic solvent in the step (A) or as an extraction solvent for the aqueous phase separated in the step (B), or as both thereof, in the step (E), the distillation purification being performed while a concentration of the polycarbonate-polyorganosiloxane copolymer in a column bottom liquid of the distillation column is controlled to 6% by mass or less.

In the formula, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of 0 to 4.

In the formula, $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue including an aliphatic or aromatic moiety, n represents an average repetition number, Z represents a halogen atom, —R$^7$OH, —R$^7$—Z'—R$^8$—OH, —R$^7$COOH, —R$^7$NH$_2$, —COOH, or —SH, the $R^7$ represents a substituted or unsubstituted alkylene group, a substituted or unsubstituted cycloalkylene group, or a substituted or unsubstituted arylene group, the $R^8$ represents an arylene group having 6 to 12 ring-forming carbon atoms, the Z' represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms, and m represents 0 or 1.

[4] The method of continuously producing a polycarbonate-polyorganosiloxane copolymer according to the item [3], in which in the step (E), the concentration of the polycarbonate-polyorganosiloxane copolymer in the column bottom liquid is controlled to fall within the range by taking at least part of the column bottom liquid out of a column bottom portion of the distillation column.

[5] The method of continuously producing a polycarbonate-polyorganosiloxane copolymer according to the item [3] or [4], in which in the step (E), the concentration of the polycarbonate-polyorganosiloxane copolymer in the column bottom liquid of the distillation column is controlled to 5% by mass or less.

[6] The method of continuously producing a polycarbonate-polyorganosiloxane copolymer according to any one of the items [3] to [5], in which a concentration of carbon tetrachloride in the water-insoluble organic solvent to be reused as at least part of the water-insoluble organic solvent in the step (A) or as the extraction solvent for the aqueous phase separated in the step (B), or as both thereof is controlled to less than 20 ppm by mass.

[7] The method of continuously producing a polycarbonate-polyorganosiloxane copolymer according to any one of the items [3] to [6], in which in the step (E), a column top temperature of the distillation column is set to 35 to 70° C. and a column bottom temperature thereof is set to 45 to 80° C.

[8] The method of continuously producing a polycarbonate-polyorganosiloxane copolymer according to any one of the items [3] to [7], in which in the step (E), before part or all of the water-insoluble organic solvent is recovered and purified by distillation in the distillation column, the water-insoluble organic solvent is passed through a flash drum and the concentration of the polycarbonate-polyorganosiloxane copolymer in the solvent in the flash drum is controlled to 6% by mass or less.

[9] The method of continuously producing a polycarbonate-polyorganosiloxane copolymer according to any one of the items [3] to [8], in which the step (A) includes the following step (a-1) and the following step (a-2):

step (a-1): allowing the dihydric phenol compound represented by the general formula (1) and the carbonate precursor to react with each other in the presence of the alkaline compound aqueous solution and the water-insoluble organic solvent to produce a polycarbonate oligomer having a repeating unit represented by the following general formula (I); and step (a-2): continuously or intermittently taking the polymerization reaction liquid, which is obtained by polymerizing the dihydric phenol compound, the polycarbonate oligomer obtained in the step (a-1), and the polyorganosiloxane represented by the general formula (2) in the presence of the alkaline compound aqueous solution and the water-insoluble organic solvent, out of the reactor:

(In the formula, $R^1$, $R^2$, X, a and b are each defined in the same manner as in the foregoing.)

Advantageous Effects of Invention

According to one embodiment of the present invention, even in the production of a polycarbonate-polyorganosiloxane copolymer, the foaming of methylene chloride in a distillation column is suppressed and its distillation purification can be efficiently performed, and by extension, a polycarbonate-polyorganosiloxane copolymer having a carbon tetrachloride concentration of less than 4 ppm by mass can be continuously produced in an industrially stable manner.

DESCRIPTION OF EMBODIMENTS

In the description, a preferred definition can be arbitrarily adopted, and a combination of preferred definitions can be said to be more preferred.

According to one embodiment of the present invention, there is provided a polycarbonate-polyorganosiloxane copolymer having a carbon tetrachloride concentration of less than 4 ppm by mass, and such polycarbonate-polyorganosiloxane copolymer can be produced by the following production method.

In this case, the carbon tetrachloride concentration in the polycarbonate-polyorganosiloxane copolymer of the present invention is preferably 3 ppm by mass or less, more preferably 2 ppm by mass or less, still more preferably 1 ppm by mass or less. The polycarbonate-polyorganosiloxane copolymer of the present invention may contain carbon tetrachloride as long as its concentration falls within the range.

That is, there is provided a method of continuously producing the polycarbonate-polyorganosiloxane copolymer having a carbon tetrachloride concentration of less than 4 ppm by mass, the method comprising the steps of:

(A) continuously or intermittently taking a polymerization reaction liquid, which is obtained by polymerizing a dihydric phenol compound represented by the following general formula (1), a carbonate precursor, and a polyorganosiloxane represented by the following general formula (2) in the presence of an alkaline compound aqueous solution and a water-insoluble organic solvent, out of a reactor;

(B) separating the polymerization reaction liquid taken out in the step (A) into an aqueous phase and a water-insoluble organic solvent phase;

(C) washing the water-insoluble organic solvent phase separated in the step (B), followed by separation thereof into an aqueous phase and a water-insoluble organic solvent phase;

(D) concentrating the water-insoluble organic solvent phase separated in the step (C); and

(E) recovering part or all of the water-insoluble organic solvent removed by evaporation in the step (D), followed by distillation purification thereof in a distillation column, the water-insoluble organic solvent obtained in the step (E) being reused as at least part of the water-insoluble organic solvent in the step (A) or as an extraction solvent for the aqueous phase separated in the step (B), or as both thereof, in the step (E), the distillation purification being performed while a concentration of the polycarbonate-polyorganosiloxane copolymer in a column bottom liquid of the distillation column is controlled to 6% by mass or less.

[In the formula, $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and a and b each independently represent an integer of 0 to 4.]

(2)

[In the formula, $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond, or an organic residue including an aliphatic or aromatic moiety, n represents an average repetition number, Z represents a halogen atom, —$R^7$OH, —$R^7$—Z'—$R^8$—OH, —$R^7$COOH, —$R^7$NH$_2$, —COOH, or —SH, the $R^7$ represents a substituted or unsubstituted alkylene group, a substituted or unsubstituted cycloalkylene group, or a substituted or unsubstituted arylene group, the $R^8$ represents an arylene group having 6 to 12 ring-forming carbon atoms, the Z' represents an alkylene group having 1 to 8 carbon atoms, an alkylidene group having 2 to 8 carbon atoms, a cycloalkylene group having 5 to 10 carbon atoms, or a cycloalkylidene group having 5 to 10 carbon atoms, and m represents 0 or 1.]

Examples of the halogen atom that $R^1$ and $R^2$ in the general formula (1) each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups ("various" means that a linear group and any branched group are included, and the same holds true for the following), various pentyl groups, and various hexyl groups. An example of the alkoxy group that $R^1$ and $R^2$ each independently represent is an alkoxy group whose alkyl group moiety is the alkyl group described above.

The alkylene group represented by X is, for example, a methylene group, an ethylene group, a trimethylene group, a tetramethylene group, or a hexamethylene group, and is preferably an alkylene group having 1 to 5 carbon atoms. Examples of the alkylidene group represented by X include an ethylidene group and an isopropyl idene group. The cycloalkylene group represented by X is, for example, a cyclopentanediyl group, a cyclohexanediyl group, or a cyclooctanediyl group, and is preferably a cycloalkylene group having 5 to 10 carbon atoms. The cycloalkylidene group represented by X is, for example, a cyclohexylidene group, a 3,5,5-trimethylcyclohexylidene group, or a 2-adamantylidene group, and is preferably a cycloalkylidene group having 5 to 10 carbon atoms, more preferably a cycloalkylidene group having 5 to 8 carbon atoms.

a and b each independently represent an integer of 0 to 4, preferably 0 to 2, more preferably 0 or 1.

Examples of the halogen atom that $R^3$ to $R^6$ in the general formula (2) each independently represent include a fluorine atom, a chlorine atom, a bromine atom, and an iodine atom. Examples of the alkyl group or alkoxy group that $R^3$ to $R^6$ each independently represent include the same examples as those in the cases of $R^1$ and $R^2$. Examples of the aryl group that $R^3$ to $R^6$ each independently represent include a phenyl group and a naphthyl group.

The organic residue containing an aliphatic moiety represented by Y is, for example, an alkylene group having 1 to 10 carbon atoms (preferably 1 to 6 carbon atoms, more preferably 1 to 3 carbon atoms). In addition, examples of the organic residue containing an aromatic moiety represented by Y include arylene groups each having 6 to 12 ring-forming carbon atoms such as a phenylene group, a naphthylene group, and a biphenyldiyl group.

Examples of the halogen atom represented by Z in the general formula (2) include a fluorine atom, a chlorine atom, a bromine atom, and an iodine atom. Among them, a chlorine atom is preferred.

Examples of the alkylene group represented by $R^7$ in —$R^7$OH, —$R^7$—Z'—$R^8$—OH, —$R^7$COOH, and —$R^7$NH$_2$ each represented by Z include alkylene groups each having 1 to 10 (preferably 1 to 5) carbon atoms such as a methylene group, an ethylene group, a propylene group, a trimethylene group, and a pentamethylene group. In addition, examples of the cycloalkylene group represented by the R' include cycloalkylene groups each having 3 to 10 (preferably 4 to 8) ring-forming carbon atoms such as a cyclopentylene group and a cyclohexylene group. Examples of the arylene group represented by the $R^7$ include arylene groups each having 6 to 12 ring-forming carbon atoms such as a phenylene group, a naphthylene group, and a biphenyldiyl group.

The $R^7$ may be substituted with an alkyl group having 1 to 5 carbon atoms, an alkoxy group having 1 to 5 carbon atoms, an aryl group having 6 to 12 ring-forming carbon atoms, or the like. Examples of the alkyl group include a methyl group, an ethyl group, a propyl group, and various butyl groups. An example of the alkoxy group is an alkoxy group whose alkyl group moiety is the alkyl group described above. An example of the aryl group is a phenyl group.

Examples of the arylene group represented by $R^8$ include a phenylene group, a methoxy-substituted phenylene group, a naphthylene group, and a biphenylylene group.

Examples of the alkylene group, alkylidene group, cycloalkylene group, or cycloalkylidene group represented by Z' include the same examples as those in the case of X. Z' represents preferably an alkylidene group having 2 to 8 carbon atoms, more preferably an isopropylidene group.

In addition, the average repetition number n is preferably 25 to 120, more preferably 30 to 100. Further, the n is preferably 30 to 60 in the case of a short-chain polyorganosiloxane or is preferably 70 to 100 in the case of a long-chain polyorganosiloxane.

Examples of the dihydric phenol compound represented by the general formula (1) include: bis(hydroxyaryl)alkanes such as 2,2-bis(4-hydroxyphenyl)propane [trivial name: bisphenol A], bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl) diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene. Among them, 2,2-bis(4-hydroxyphenyl)propane [trivial name: bisphenol A] is preferred.

One of those dihydric phenol compounds may be used alone, or two or more thereof may be used as a mixture.

Examples of the carbonate precursor include carbonyl halides, carbonic acid diesters and haloformates, and specific examples thereof include phosgene, diphenyl carbonate and a dihaloformate of a dihydric phenol compound. Among them, phosgene is preferred.

In addition, the polyorganosiloxane represented by the general formula (2) can be easily produced by subjecting a phenol having an olefinically unsaturated carbon-carbon bond (preferably, for example, vinylphenol, allylphenol, eugenol, or isopropenylphenol) to a hydrosilylation reaction with a terminal of a polyorganosiloxane chain having a predetermined polymerization degree n. The phenol is more preferably allylphenol or eugenol. In this case, Y in the general formula (2) represents an organic residue derived from allylphenol or eugenol.

Examples of the polyorganosiloxane represented by the general formula (2) include the following.

In the general formulae (3) to (11), $R^3$ to $R^6$ are the same as $R^3$ to $R^6$ in the general formula (2). n is the same as n in the general formula (2). In addition, c represents a positive integer and is preferably an integer of 1 to 6, more preferably an integer of 1 to 3, still more preferably 3.

Among them, the phenol-modified polyorganosiloxane represented by the general formula (3) is preferred from the viewpoint of easiness of polymerization. Further, α,ω-bis[3-(o-hydroxyphenyl)propyl]polydimethylsiloxane, which is one of the compound represented by the general formula (4), or α,ω-bis[3-(4-hydroxy-3-methoxyphenyl)propyl]polydimethylsiloxane, which is one of the compound represented by the general formula (5), is preferred from the viewpoint of easiness of availability.

Further, the PC-POS copolymer can be produced by copolymerizing the dihydric phenol represented by the general formula (1), a polyorganosiloxane represented by the following general formula (12), and phosgene, a carbonate, or a chloroformate. In this case, the polyorganosiloxane represented by the following general formula (12) is a reaction product of the polyorganosiloxane represented by the general formula (2) and a diisocyanate compound.

(3)

(4)

(5)

(6)

(7)

(9)

(8)

(10)

(11)

In the general formula (12), $R^3$ to $R^6$, n, m, Y, and Z are each defined in the same manner as that in the general formula (2), and preferred examples thereof are also the same as those of the symbols in the formula.

$Z^1$ represents a divalent group derived from Z in the polyorganosiloxane represented by the general formula (2) after the reaction of Z with an —NCO group of the diisocyanate compound.

In addition, β represents a divalent group derived from the diisocyanate compound or from a dicarboxylic acid compound, and examples thereof include divalent groups each represented by any one of the following general formulae (12-1) to (12-5).

The phenol-modified polyorganosiloxane can be produced by a known method. For example, the following is available as the known production method.

Cyclotrisiloxane and disiloxane are allowed to react with each other in the presence of an acid catalyst to synthesize an α,ω-dihydrogen organopolysiloxane. At this time, an α,ω-dihydrogen organopolysiloxane having a desired average repeating unit can be synthesized by changing a loading ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction, whereby a phenol-modified polyorganosiloxane having a desired average repeating unit can be produced.

In addition, at this stage, a cyclic polyorganosiloxane having a low molecular weight and an excessive amount of the phenol compound remain as impurities. Accordingly, those low-molecular weight compounds are removed by evaporation through heating under reduced pressure.

(Polycarbonate-Polyorganosiloxane Copolymer: PC-POS)

A PC-POS obtained by the production method of the present invention has a repeating unit represented by the following general formula (I) and a constituent unit represented by the following general formula (II):

[in the formulae, $R^1$ to $R^6$, X, Y, a, b and n are the same as defined above].

In the PC-POS, the content of the constituent unit represented by the general formula (II) is not particularly limited, but is preferably 1 to 25% by mass, more preferably 2 to 10% by mass. When the content is 1% by mass or more, the impact resistance is excellent, and when the content is 25% by mass or less, the heat resistance is satisfactory.

In addition, in the PC-POS, the average repeating number n in the constituent unit represented by the general formula (II) is preferably 25 to 120, more preferably 30 to 100. Further, the n is preferably 30 to 60 in the case of a short-chain polyorganosiloxane or is preferably 70 to 100 in the case of a long-chain polyorganosiloxane. In the PC-POS, when n represents 25 or more, the impact resistance is excellent, and when n represents 120 or less, the transparency is satisfactory.

The viscosity-average molecular weight (Mv) of the PC-POS is not particularly limited, but is preferably 10,000 to 30,000, more preferably 13,000 to 25,000, more preferably 15,000 to 23,000, more preferably 15,000 to 21,000, more preferably 16,000 to 20,000, particularly preferably 16,000 to 18,000. When the viscosity-average molecular weight of the PC-POS falls within the range, the strength of a molded article is sufficient, the viscosity of the copolymer does not become excessively large, and the productivity at the time of production is stable.

It should be noted that the viscosity-average molecular weight (Mv) in the description is calculated from the following relational expression (Schnell's equation) by measuring the limiting viscosity [η] of a methylene chloride solution at 20° C. with an Ubbelohde-type viscosity tube.

$$[\eta]=1.23\times10^{-5}\times Mv^{0.83}$$

[Method of Producing Polycarbonate-Polyorganosiloxane Copolymer]

As described above, the method of producing a polycarbonate-polyorganosiloxane copolymer (PC-POS) according to the present invention includes the step (A) to the step (E).

(Step (A))

The step (A) is a step of continuously or intermittently taking a polymerization reaction liquid, which is obtained by polymerizing a dihydric phenol compound represented by the general formula (1), a carbonate precursor, and a polyorganosiloxane represented by the general formula (2) in the presence of an alkaline compound aqueous solution and a water-insoluble organic solvent, out of a reactor. In the step (A), the polymerization can also be performed in the presence of a polymerization catalyst or a molecular weight modifier, as necessary. The alkaline compound aqueous solution, the water-insoluble organic solvent, the polymerization catalyst, and the molecular weight modifier are described below.

Although there is no particular limitation, from the viewpoint of increasing the transparency of the PC-POS, the step (A) preferably includes the following step (a-1) and the following step (a-2):

step (a-1): allowing a dihydric phenol compound represented by the general formula (1) and a carbonate precursor to react with each other in the presence of an alkaline compound aqueous solution and a water-insoluble organic solvent to produce a polycarbonate oligomer having a repeating unit represented by the general formula (I); and step (a-2): continuously or intermittently taking a polymerization reaction liquid, which is obtained by polymerizing the dihydric phenol compound, the polycarbonate oligomer obtained in the step (a-1), and a polyorganosiloxane represented by the general formula (2) in the presence of an alkaline compound aqueous solution and a water-insoluble organic solvent, out of a reactor.

(Step (a-1))

In the step (a-1), the reaction between the dihydric phenol compound and the carbonate precursor is not particularly limited, a known method can be adopted, and it is preferred to carry out the reaction in the presence of an alkaline compound aqueous solution and a water-insoluble organic solvent by the interfacial polymerization method. As necessary, the reaction can also be carried out in the presence of a polymerization catalyst, and it is preferred that the reaction be carried out in such a manner.

Examples of the alkaline compound include alkali metal hydroxides such as sodium hydroxide and potassium hydroxide; and alkaline earth metal hydroxides such as magnesium hydroxide and calcium hydroxide. Among them, an alkali metal hydroxide is preferred, and sodium hydroxide is more preferred. It should be noted that the dihydric phenol compound is preferably used as a mixture with the alkaline compound aqueous solution.

As the water-insoluble organic solvent, for example, a halogenated hydrocarbon such as methylene chloride, chlorobenzene or chloroform is preferred, and methylene chloride is more preferred.

Examples of the polymerization catalyst include tertiary amines and quaternary ammonium salts. Examples of the tertiary amine include trimethylamine, triethylamine, and tripropylamine. Examples of the quaternary ammonium salt include trimethylbenzylammonium chloride and triethylammonium chloride. As the polymerization catalyst, a tertiary amine is preferred, and triethylamine is more preferred.

In the step (a-1), a molecular weight modifier may be used, as necessary. The molecular weight modifier is not particularly limited so long as the modifier is a monohydric phenol, and examples thereof include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-nonylphenol, m-nonylphenol, p-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, p-bromophenol, 2,4,6-tribromophenol, a monoalkylphenol having a linear or branched alkyl group having 12 to 35 carbon atoms on average at the ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol. Among them, p-t-butylphenol, p-cumylphenol, and p-phenylphenol are preferred, and p-t-butylphenol is more preferred.

It should be noted that the molecular weight modifier is preferably used after dissolution in a water-insoluble organic solvent so that its concentration may become preferably 2 to 20% by mass, more preferably 4 to 15% by mass, still more preferably 4 to 12% by mass. Examples of the water-insoluble organic solvent include the same solvents as those described above. Among them, methylene chloride is preferred.

Although an embodiment of the reaction is not particularly limited, preferred is a method involving continuously or intermittently supplying the alkaline compound aqueous solution of a dihydric phenol compound, the water-insoluble organic solvent, and the carbonate precursor into a reactor, and as necessary, adding the polymerization catalyst aqueous solution thereto, while keeping the temperature of the reaction liquid at 40° C. or less, to thereby perform the reaction.

The weight-average molecular weight (Mw) of the thus obtained polycarbonate oligomer is preferably 500 to 3,000, more preferably 700 to 2,000, still more preferably 800 to 1,500.

The reaction mixed liquid obtained in the step (a-1) is separated into an aqueous phase and a water-insoluble organic solvent phase, and the water-insoluble organic solvent phase containing the polycarbonate oligomer is used in the step (a-2). Meanwhile, there may be the case where the polycarbonate oligomer or the dihydric phenol compound is also incorporated into the aqueous phase. Then, with respect to the aqueous phase, it is preferred that such an organic material be extracted with a water-insoluble organic solvent, and the resultant extract be used as a part or the whole of the water-insoluble organic solvent to be used in the step (a-2). It is preferred to perform the extraction operation by mixing the aqueous phase with an aqueous phase that is obtained by washing with an acidic aqueous solution in a step (C) to be described below and then separating.

(Step (a-2))

The step (a-2) is a step of continuously or intermittently taking a polymerization reaction liquid, which is obtained by polymerizing the dihydric phenol compound, the polycarbonate oligomer obtained in the step (a-1), and a polyorganosiloxane represented by the general formula (2) in the presence of an alkaline compound aqueous solution and a water-insoluble organic solvent, out of a reactor. As necessary, the reaction can also be carried out in the presence of a polymerization catalyst, and it is preferred that the reaction be carried out in such a manner.

An embodiment of the polymerization reaction in the step (a-2) is not particularly limited, and a known method can be adopted. However, from the viewpoint of reducing the amount of the unreacted PDMS as much as possible, it is preferred to divide the polymerization reaction into a preliminary polymerization step and a main polymerization step.

(Preliminary Polymerization Step)

The preliminary polymerization step is a step of continuously or intermittently supplying a polycarbonate oligomer having the repeating unit represented by the general formula (I) and a water-insoluble organic solvent, a polyorganosiloxane represented by the general formula (2), a water-insoluble organic solvent, and an alkaline compound aqueous solution, to thereby perform the reaction. As necessary, the reaction can also be carried out in the presence of a polymerization catalyst, and it is preferred that the reaction be carried out in such a manner.

In this step, operation procedures are preferred in which the polycarbonate oligomer having the repeating unit represented by the general formula (I) and the water-insoluble organic solvent, and the polyorganosiloxane represented by the general formula (2) are supplied and mixed; thereafter, the polymerization catalyst is supplied, as necessary; and subsequently, the alkaline compound aqueous solution is supplied and mixed.

(Main Polymerization Step)

The main polymerization step is a step of, after cooling the preliminary polymerization liquid obtained in the preliminary polymerization step to 25° C. or less, continuously or intermittently supplying an alkaline compound aqueous solution of the dihydric phenol compound represented by the general formula (1) and a molecular weight modifier thereto and mixing to perform the main polymerization, and continuously or intermittently taking the resultant polymerization reaction liquid out of a reactor. As necessary, the main polymerization can also be carried out in the presence of a polymerization catalyst, and it is preferred that the main polymerization be carried out in such a manner.

In the preliminary polymerization step, it is preferred that each of the polyorganosiloxane and the polycarbonate oligomer on the occasion of mixing the polyorganosiloxane be dissolved in or mixed with the water-insoluble organic solvent. In that case, the concentration of the polyorganosiloxane is preferably 10 to 30% by mass, more preferably 15 to 25% by mass. The solid content concentration of the polycarbonate oligomer solution is set to preferably 300 g/L or less, more preferably 170 to 250 g/L, still more preferably 180 to 240 g/L. With this, the transparency of the polycarbonate-polyorganosiloxane copolymer can be increased. This is because the compatibility between the polyorganosiloxane and the polycarbonate oligomer is low, and hence, when the polyorganosiloxane concentration or the polycarbonate oligomer concentration (solid content concentration) is too high, the polyorganosiloxane tends to exist in a dispersed state in the polycarbonate oligomer. When the polyorganosiloxane concentration is set to 10 to 30% by mass, and the polycarbonate oligomer concentration is set to 300 g/L or less, the polyorganosiloxane can be quickly and sufficiently dissolved in the polycarbonate oligomer solution with ease, and hence the uniformity of the polymerization reaction is enhanced. As a result, a polycarbonate-polyorganosiloxane copolymer having excellent transparency tends to be obtained.

A supply ratio between the supply rate of the polycarbonate oligomer and the supply rate of the polyorganosiloxane [polycarbonate oligomer:polyorganosiloxane] may be appropriately set in consideration of the composition of the PC-POS to be produced.

In the preliminary polymerization step, the polymerization catalyst is preferably used as a solution of a water-insoluble organic solvent from the viewpoint of enhancing the uniformity of the reaction to increase the transparency of the polycarbonate-polyorganosiloxane copolymer to be obtained. Examples of the water-insoluble organic solvent include the same solvents as those described above. Among them, methylene chloride is preferred from the viewpoint of enhancing the dispersibility of the polymerization catalyst. The concentration of the polymerization catalyst in the polymerization catalyst solution is preferably 0.05 to 5% by mass, more preferably 0.1 to 5% by mass.

In the preliminary polymerization step, the alkaline compound is preferably used as an alkaline compound aqueous solution. In addition, in that case, it is preferred to set the concentration of the alkaline compound aqueous solution (hereinafter abbreviated as alkali concentration) to 2 to 15% by mass. On the occasion of the preliminary polymerization, the alkaline compound is consumed by three reactions including (1) a react ion between the polycarbonate oligomer and the polyorganosiloxane, (2) a reaction between a chloroformate group of the polycarbonate oligomer and a hydroxyl group, and (3) a decomposition reaction of a chloroformate group of the polycarbonate oligomer. When the alkali concentration of the alkaline compound aqueous solution to be supplied is 15% by mass or less, the progress of the reaction (3) can be suppressed from the standpoint of a reaction rate, and an increase in the amount of the unreacted polyorganosiloxane can be suppressed. The alkali concentration of the alkaline compound aqueous solution to be supplied at the time of preliminary polymerization is preferably 3 to 15% by mass, more preferably 3 to 12% by mass from the viewpoints of reaction efficiency of the polyorganosiloxane and transparency of the polycarbonate-polyorganosiloxane copolymer.

It should be noted that the preliminary polymerization is carried out by an interfacial polymerization reaction. In general, in the case of an interfacial polymerization reaction, there are included two ways of the case where the aqueous phase is a continuous phase and the case where the water-insoluble organic solvent phase is a continuous phase, and in order to obtain a PC-POS having excellent transparency, it is preferred that the water-insoluble organic solvent phase be a continuous phase. For the purpose of increasing the uniformity of a reaction between the polyorganosiloxane and the polycarbonate oligomer in order to obtain the transparency, the water-insoluble organic solvent phase is stirred as a continuous phase and then the uniformity between both of the polyorganosiloxane and the polycarbonate oligomer can be increased, because both of the polyorganosiloxane and the polycarbonate oligomer exist in the water-insoluble organic solvent phase.

In the main polymerization step, the preliminary polymerization liquid obtained in the preliminary polymerization step is preferably once cooled to 25° C. or less (preferably about 15 to 20° C.). Thereafter, the alkaline compound aqueous solution of the dihydric phenol compound represented by the general formula (1) and the molecular weight modifier (chain-end terminator), and as necessary, a polymerization catalyst are continuously or intermittently supplied and mixed to perform the main polymerization.

With respect to the alkaline compound, the molecular weight modifier (chain-end terminator), and the polymerization catalyst, the same materials as those described above are exemplified, and preferred materials are also the same. It should be noted that the molecular weight modifier is preferably used after dissolved in a water-insoluble organic solvent so that its concentration may become preferably 2 to 20% by mass, more preferably 4 to 15% by mass, still more preferably 4 to 12% by mass. Examples of the water-insoluble organic solvent include the same solvents as those described above. Among them, methylene chloride is preferred.

The thus obtained polymerization reaction liquid is continuously or intermittently taken out of a reactor and transferred into the step (B).

(Step (B))

The step (B) is a step of separating the polymerization reaction liquid taken out in the step (A) (referring to the polymerization reaction liquid taken out after the step (a-2) in the case where the step (A) includes the step (a-1) and the step (a-2)) into an aqueous phase and a water-insoluble organic solvent phase. The method for the separation is not particularly limited, and standing separation may be adopted. From the viewpoint of making the separated state between the aqueous phase and the water-insoluble organic solvent phase satisfactory, it is preferred to perform centrifugation. Although the centrifugation condition is not particularly limited, in general, a rotational speed is preferably about 1,000 to 3,000 rpm.

The aqueous phase obtained in the step (B) is preferably reused in the step (A), especially the step (a-1) from the viewpoint of a production cost because the aqueous phase contains the dihydric phenol compound or the alkaline compound.

(Step (C))

The step (C) is a step of washing the water-insoluble organic solvent phase obtained in the step (B), followed by its separation into an aqueous phase and a water-insoluble organic solvent phase. A method for the washing is, for example, alkali washing, acid washing, or water washing, and at least the acid washing and the water washing are preferably performed.

[Alkali Washing]

In many cases, the water-insoluble organic solvent phase obtained in the step (B) contains a trace amount of the dihydric phenol compound, and therefore, it is preferred to wash the water-insoluble organic solvent phase with an alkali aqueous solution (hereinafter sometimes referred to as alkali washing).

Examples of the alkaline compound to be used for the alkali aqueous solution include the same materials as those used in the step (A), and it is preferred to use the same material. Although the temperature at which the phase is washed is not particularly limited as long as the temperature is equal to or less than the boiling point of the water-insoluble organic solvent, the washing temperature is preferably 37° C. or less, more preferably 34° C. or less, still more preferably 30° C. or less, particularly preferably 28° C. or less.

After the washing with the alkali aqueous solution, the resultant is separated into an aqueous phase and a water-insoluble organic solvent phase. On this occasion, the method for the separation is not particularly limited, and standing separation may be adopted. From the viewpoint of making the separated state between the aqueous phase and the water-insoluble organic solvent phase satisfactory, it is preferred to perform centrifugation at the above-mentioned rotational speed. Although the amount of the alkali aqueous solution to be used for the washing is not particularly limited, the amount is preferably about 5 to 40% by volume, more preferably 5 to 30% by volume, still more preferably 10 to 20% by volume in the whole liquid, from the viewpoints of a washing effect and a reduction in the generation amount of waste water. When the amount of the alkali aqueous solution is 40% by volume or less, the continuous phase does not change from the organic phase to the aqueous phase, and the extraction efficiency from the organic phase can be kept high.

The aqueous phase obtained in the alkali washing step is preferably reused in the step (A), especially the step (a-1) from the viewpoint of a production cost because the aqueous phase contains the dihydric phenol compound or the alkaline compound.

[Acid Washing]

The water-insoluble organic solvent phase separated in the step (B) or the water-insoluble organic solvent phase after the alkali washing is preferably washed with an acidic aqueous solution (hereinafter sometimes referred to as acid washing). The acid washing can remove the polymerization catalyst or a trace amount of the alkaline compound that may be present in the water-insoluble organic solvent phase. An acid to be used in the preparation of the acidic aqueous solution is, for example, hydrochloric acid or phosphoric acid. Among them, hydrochloric acid is preferred. However, the acid is not particularly limited thereto. Although the temperature at which the phase is washed is not particularly limited as long as the temperature is equal to or less than the boiling point of the water-insoluble organic solvent, the washing temperature is preferably 37° C. or less, more preferably 34° C. or less, still more preferably 30° C. or less, particularly preferably 28° C. or less.

After the acid washing, the washed phase is separated into an aqueous phase and a water-insoluble organic solvent phase. A method for the separation is not particularly limited and centrifugal separation can be adopted, but it is sufficient to adopt standing separation.

[Water Washing]

The water-insoluble organic solvent phase to be obtained after the washing is preferably washed with water once or more, more preferably washed with water one to three times because the phase tends to contain the acid used in the washing or inorganic matter. In this case, the water-insoluble organic solvent phase can be evaluated for its cleanness on the basis of the electric conductivity of the aqueous phase after the washing. A target electric conductivity is preferably 1 mS/m or less, more preferably 0.5 mS/m or less. Although the temperature at which the phase is washed is not particularly limited as long as the temperature is equal to or less than the boiling point of the water-insoluble organic solvent, the washing temperature is preferably 37° C. or less, more preferably 34° C. or less, still more preferably 30° C. or less, particularly preferably 28° C. or less.

After the washing with water, the washed phase is separated into an aqueous phase and a water-insoluble organic solvent phase. A method for the separation at that time is also not particularly limited and centrifugal separation can be adopted, but it is sufficient to adopt standing separation. It should be noted that the electric conductivity is a value measured with an electric conductivity-measuring device "DS-7" (manufactured by HORIBA, Ltd.).

Incidentally, the aqueous phase separated in the step (B) or the step (C) contains the PC-POS, and in some cases, the polymerization catalyst or the like, and hence the following is preferably adopted from the viewpoint of a production cost: the PC-POS, the polymerization catalyst, or the like is extracted with a water-insoluble organic solvent, and part or all of the extract is appropriately subjected to a devolatilizing step for carbon dioxide removal or distillation purifying step before the aqueous phase is reused in the step (A), especially the step (a-2). A method described in JP 2005-60599 A can be adopted for the devolatilizing step. Upon reuse of the water-insoluble organic solvent used in the extraction, the water-insoluble organic solvent is typically transported with a liquid delivery pump, and hence the concentration of the PC-POS in the total amount of the water-insoluble organic solvent to be reused is set to preferably 2% by mass or less (more preferably 1.5% by mass or less, still more preferably 1% by mass or less) from the viewpoint of suppressing, for example, the occurrence of cavitation in the liquid delivery pump and from the viewpoint of stably performing a devolatilization operation.

Further, in the present invention, the following is preferably adopted from the viewpoint of a production cost: an aqueous phase obtained by separating the reaction mixed liquid obtained in the step (a-1) into the aqueous phase and a water-insoluble organic solvent phase is mixed with an aqueous phase obtained by separation after acid washing, the resultant aqueous phase is subjected to extraction with a water-insoluble organic solvent, and part or all of the extract is reused as the water-insoluble organic solvent in the step (A) (provided that the solvent may contain the dihydric phenol compound, the polycarbonate oligomer, the polymerization catalyst, or the like).

The water-insoluble organic solvent is removed by evaporation through the concentration of the water-insoluble organic solvent phase that has undergone the step (C) [step (D); concentrating step], and the residue is pulverized [pulverizing step] and dried preferably under reduced pressure at about 80 to 160° C. [drying step] or further granulated [granulating step]. Thus, the PC-POS can be obtained.

In the step (D), the concentration is performed so that the solid content concentration of the water-insoluble organic solvent may become preferably 30 to 40% by mass, more preferably 30 to 35% by mass.

In addition, in the drying step, the drying is performed so that the solid content concentration of the water-insoluble organic solvent may preferably become 99.9% by mass or more (the concentration of methylene chloride in the resin may preferably become less than 1,000 ppm).

In the present invention, part or all of the water-insoluble organic solvent removed by evaporation in the concentrating step is reused as at least part of the water-insoluble organic solvent in the step (A) or as a solvent (extraction solvent) for extracting organic matter such as the PC-POS from the aqueous phase separated in the step (B) or each of the washing steps, or as both thereof after having undergone a step (E) to be described later. Further, part or all of the water-insoluble organic solvent obtained in the drying step is preferably reused as at least part of the water-insoluble organic solvent in the step (A) or as a solvent (extraction solvent) for extracting organic matter such as the PC-POS from the aqueous phase separated in the step (B) or each of the washing steps, or as both thereof after having undergone the step (E) to be described later.

(Step (E))

Upon production of phosgene as a raw material for the PC-POS copolymer, carbon tetrachloride ($CCl_4$) is produced as a by-product, and hence carbon tetrachloride is gradually accumulated in a reactor by the cyclic use of methylene chloride. When the reactor is continuously driven as it is, the concentration of carbon tetrachloride in the PC-POS copolymer becomes 4 ppm by mass or more, which causes the deterioration of the color tone of the PC-POS copolymer and the corrosion of a die. In view of the foregoing, the water-insoluble organic solvent to be reused needs to be purified by distillation as described in the foregoing in order that the concentration of carbon tetrachloride in the PC-POS copolymer may be set to less than 4 ppm by mass. The water-insoluble organic solvent to be reused may be the water-insoluble organic solvent purified by distillation alone, or may be a mixture of the water-insoluble organic solvent purified by distillation and an undistilled water-insoluble organic solvent (e.g., the water-insoluble organic solvent obtained in the step (D)). In all cases, the concentration of carbon tetrachloride in the water-insoluble organic solvent is set to preferably less than 20 ppm by mass, more preferably 10 ppm by mass or less, still more preferably 5 ppm by mass or less, particularly preferably 3 ppm by mass or less. When the concentration of carbon tetrachloride in the water-insoluble organic solvent to be reused is reduced as described above, the concentration of carbon tetrachloride in the PC-POS copolymer can be easily reduced to less than 4 ppm by mass. It should be noted that a flash drum may be placed for preventing the clogging of a distillation column tray.

In this context, further studies made by the inventors of the present invention have found that unlike the case of the production of a normal polycarbonate-based resin, in the production of the PC-POS copolymer, the concentration of carbon tetrachloride in the PC-POS copolymer is liable to increase. The foregoing is assumed to result from: the fact that when the distillation purification of methylene chloride is performed, a reboiler at the bottom portion of a distillation column causes a heat transfer failure owing to the foaming of methylene chloride containing a slight amount of the PC-POS copolymer, and hence stable driving of the distillation column cannot be performed in some cases; and the fact that even when a flash drum is used, the discharge pressure of a circulating pump at the bottom portion of the flash drum may be destabilized. In the present invention, the problem has been solved by controlling the concentration of the PC-POS copolymer in the column bottom liquid of the distillation column to 6% by mass or less. The concentration of the PC-POS copolymer in the column bottom liquid of the distillation column is preferably controlled to 5% by mass or less. Although the problem is assumed to be due to the fact that a high concentration of the PC-POS copolymer in the column bottom liquid has been responsible for the foaming of methylene chloride, the phenomenon is a problem that arises only in the production of the PC-POS copolymer because the phenomenon does not arise in a normal polycarbonate resin (e.g., a polycarbonate resin obtained from the dihydric phenol compound represented by the general formula (1) and the carbonate precursor, especially a polycarbonate resin free of any organosiloxane structural unit).

Although a method of setting the concentration of the PC-POS in the column bottom liquid within the range is not particularly limited, a preferred example thereof is a method involving taking out the column bottom liquid to reduce the concentration of the PC-POS copolymer. Although the rate at which the column bottom liquid is taken out is not particularly limited as long as the concentration of the PC-POS copolymer can be set to fall within the range, for example, the following method is given: the column bottom liquid is taken out at a flow rate corresponding to 0.3 to 2% by mass of the amount of the water-insoluble organic solvent to be fed to the distillation column.

Although a method of monitoring the concentration of the PC-POS in the column bottom liquid is not particularly limited, examples thereof include: a method involving sampling the column bottom liquid of the distillation column during its driving, removing the water-insoluble organic solvent by evaporation to dryness, and measuring the amount of the solid content in the residue; and a method involving placing a concentration meter.

Although conditions for the distillation purification are not particularly limited except the foregoing matters, the distillation is preferably performed with a multistage distillation column having 30 to 60 stages under the conditions of a reflux ratio of 0.3 to 5 (preferably 1 to 4, more preferably 1 to 3), a pressure of from normal pressure to 0.2 MPa (gauge pressure), a column top temperature of 35 to 70° C. (preferably 35 to 45° C.), and a column bottom temperature of 45 to 80° C. (preferably 45 to 60° C.).

In the present invention, the following method can also be preferably adopted: before part or all of the water-insoluble organic solvent is recovered and purified by distillation in the distillation column, the water-insoluble organic solvent is passed through a flash drum and the concentration of the polycarbonate-polyorganosiloxane copolymer in the solvent in the flash drum is controlled to 6% by mass or less. The concentration of the polycarbonate-polyorganosiloxane copolymer in the water-insoluble organic solvent in the flash drum is more preferably 5% by mass or less.

It should be noted that the concentration of the PC-POS copolymer in the water-insoluble organic solvent phase to be reused is controlled to preferably 2% by mass or less, more preferably 1.5% by mass or less, still more preferably 1% by mass or less.

The content of carbon tetrachloride in the PC-POS copolymer obtained as described above is less than 4 ppm by mass, preferably 3 ppm by mass or less, more preferably 2 ppm by mass or less, still more preferably 1 ppm by mass or less, and hence the PC-POS copolymer is a high-quality PC-POS copolymer. According to the present invention, such high-quality PC-POS copolymer can be continuously produced for a long time period. It should be noted that the content of carbon tetrachloride in the PC-POS copolymer is measured by a method described in Examples.

In addition, the amount of a polyorganosiloxane residue in the PC-POS copolymer is preferably 0.1 to 40% by mass, more preferably 1 to 10% by mass, still more preferably 3 to 6.5% by mass.

EXAMPLES

Examples of the present invention are further described. It should be noted that the present invention is by no means limited by Examples. It should be noted that in each example, a viscosity-average molecular weight (Mv) and the amount of a polydimethylsiloxane (PDMS) residue in a PC-PDMS were measured in accordance with the following methods. In addition, the measurement of the concentration of a PC-PDMS in a column bottom liquid was performed by a method involving removing a water-insoluble organic solvent by evaporation to dryness and measuring the amount of the solid content in the residue, and the measurement of the concentration of carbon tetrachloride in methylene chloride and the measurement of the concentration of carbon tetrachloride in a PC-PDMS pellet were performed by gas chromatography measurement under the following conditions.

[1. Amount of Polydimethylsiloxane (PDMS) Residue in PC-PDMS]

The amount was determined by focusing attention on protons of methyl groups in a PDMS by NMR measurement.

[2. Method of Measuring Viscosity-Average Molecular Weight (Mv)]

The viscosity-average molecular weight (Mv) was calculated from the following relational expression (Schnell's equation) by measuring the limiting viscosity [η] of a methylene chloride solution at 20° C. with an Ubbelohde-type viscosity tube.

$$[\eta]=1.23\times10^{-5}\times Mv^{0.83}$$

[3. Gas Chromatography Measurement Condition]
Apparatus: Model number "7890A" (manufactured by Agilent Technologies)
Analysis conditions: An injection port temperature of 200° C. and a detector temperature of 220° C.
Column: A capillary column ("DB-WAX" manufactured by J & W, film thickness: 1 μm, inner diameter: 0.53 mm, length: 60 m)
Column temperature: The temperature is increased 40° C. to 65° C. at 2° C./min and is increased to 120° C. at 5° C./min.
Detector: A hydrogen flame ionization detector (FID)

Synthesis Example 1

Production of Polycarbonate Oligomer Solution (Step (A)-Step (a-1))

To a 5.6% by mass sodium hydroxide aqueous solution, sodium dithionite was added in an amount of 2,000 ppm by mass relative to bisphenol A to be dissolved later, and bisphenol A was then dissolved therein so that the concentration of bisphenol A became 13.5% by mass, to thereby prepare a solution of bisphenol A in aqueous sodium hydroxide (aqueous solution of BPNa).

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr and 4.0 kg/hr, respectively. The tubular reactor had a jacket portion, and cooling water was passed through the jacket to keep the reaction liquid at a temperature of 40° C. or less.

The reaction liquid that had exited the tubular reactor was continuously introduced into a baffled vessel-type reactor having an internal volume of 40 L and provided with a sweptback blade, and then, 2.8 L/hr of the solution of bisphenol A in aqueous sodium hydroxide, 0.07 L/hr of a 25% by mass sodium hydroxide aqueous solution, 17 L/hr of water, and 0.64 L/hr of a 1% by mass triethylamine aqueous solution were further added to the reactor to perform a reaction. The reaction liquid overflown from the vessel-type reactor was continuously taken out and allowed to stand to separate and remove an aqueous phase, and a methylene chloride phase was then collected.

The concentration of the thus obtained polycarbonate oligomer solution (methylene chloride solution) was 324 g/L, and the concentration of a chloroformate group thereof was 0.74 mol/L. In addition, the polycarbonate oligomer had a weight-average molecular weight (Mw) of 1,190.

It should be noted that the weight-average molecular weight (Mw) was measured as a molecular weight (weight-average molecular weight: Mw) in terms of standard polystyrene by GPC (column: TOSOH TSK-GEL MULTIPORE HXL-M (two)+Shodex KF801 (one), temperature: 40° C., flow rate: 1.0 ml/min, detector: RI) with tetrahydrofuran (THF) as a developing solvent.

Example 1

Figure 1:
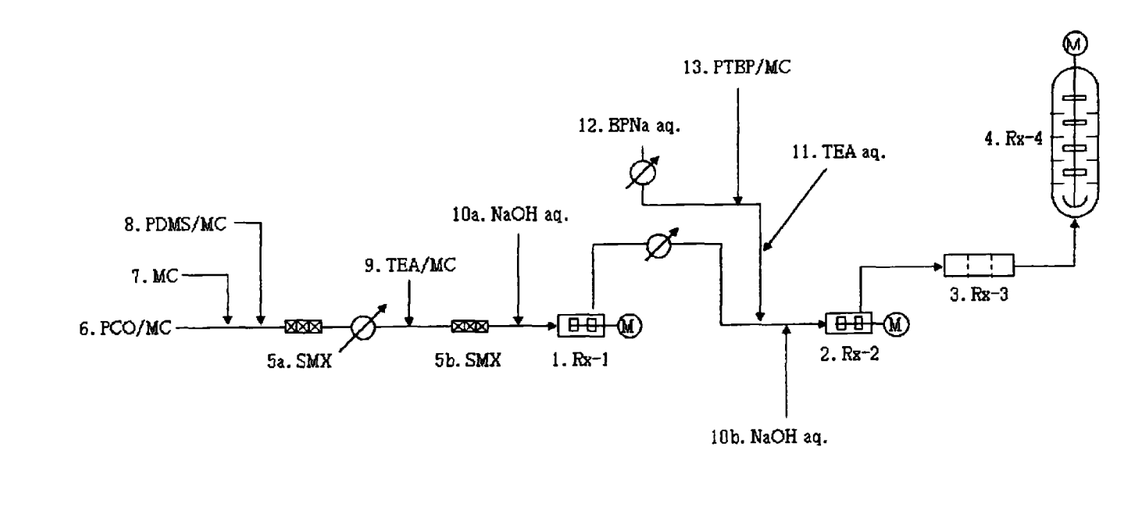
FIG. 1 is a schematic view of an apparatus for producing a polycarbonate-polyorganosiloxane copolymer used in Examples.

A polycarbonate-polydimethylsiloxane copolymer was continuously produced with a production apparatus illustrated in FIG. 1. A method for the production is specifically as described below.

(Step (A)-Step (a-2))

26 Kilograms per hour of the polycarbonate oligomer (PCO) solution [6. PCO/MC] produced in Synthesis Example 1 and 11.8 kg/hr of methylene chloride [7. MC] were mixed in piping (PCO concentration: 223 g/L). Then, 2.7 kg/hr of a 20% by mass solution of an allylphenol terminal-modified polydimethylsiloxane in which the repetition number n of dimethylsiloxane units was 90 in methylene chloride [8. PDMS/MC] were mixed with the mixture in the piping. After that, the contents were sufficiently mixed with a static mixer [5a. SMX] and then the mixed liquid was cooled to 19 to 22° C. with a heat exchanger.

The cooled mixed liquid was mixed with 0.52 kg/hr of a 1% by mass solution of triethylamine (TEA) in methylene chloride [9. TEA/MC] in the piping and then the contents were sufficiently mixed with a static mixer [5b. SMX]. After that, 1.84 kg/hr of 6.4% by mass aqueous sodium hydroxide [10a. aqueous NaOH] were added to the mixture immediately in front of a reactor [1. Rx-1], and a reaction (preliminary polymerization) between the polycarbonate oligomer and the allylphenol terminal-modified PDMS was performed in the reactor [1. Rx-1] while a methylene chloride phase was used as a continuous phase. It should be noted that the reactor [1. Rx-1] was a mixer provided with a turbine blade (pipeline homomixer [manufactured by Tokushu Kika Kogyo Co., Ltd.]) and was driven at a number of rotations of 4,400 rpm.

A preliminary polymerization liquid that had exited the reactor [1. Rx-1] was cooled to 17 to 20° C. with a heat exchanger. After that, a mixture obtained by adding 20.3 kg/hr of an 8% by mass solution of p-t-butylphenol (PTBP) in methylene chloride [13. PTBP/MC] to 0.18 kg/hr of a 1% by mass aqueous solution of triethylamine [11. aqueous solution of TEA] and 11.2 kg/hr of a solution of bisphenol A in aqueous sodium hydroxide [12. aqueous solution of BPNa], and mixing the contents in the piping was added to the preliminary polymerization liquid immediately in front of a reactor [2. Rx-2]. After that, 5.1 kg/hr of a 15% by mass aqueous NaOH [10b. aqueous NaOH] were added to the mixed liquid and a polymerization reaction (main polymerization) was performed in the reactor [2. Rx-2]. It should be noted that the reactor [2. Rx-2] was a mixer provided with a turbine blade and was driven at a number of rotations of 4,400 rpm. The solution of bisphenol A in aqueous sodium hydroxide used here was the same as the aqueous solution of BPNa used in Synthesis Example 1.

A polymerization reaction liquid that had exited the reactor [2. Rx-2] was sequentially introduced into a reactor [3. Rx-3] and a reactor [4. Rx-4], and the polymerization reaction was completed while its temperature was controlled to 38° C. or less. The reactor [3. Rx-3] is a reactor having an orifice plate and a cooling jacket, and the reactor [4. Rx-4] is a five-stage tower reactor having a cooling jacket.

(Separating Step (Step (B)))

35 Liters of the polymerization reaction liquid collected from the reactor [4. Rx-4] and 10 L of methylene chloride for dilution were charged into a 50-L vessel-type washing vessel provided with a baffle board and a paddle-type stirring blade, and were stirred at 240 rpm for 10 minutes. After that, the mixture was left to stand for 1 hour to be separated into an organic phase containing the polycarbonate-polydimethylsiloxane copolymer (PC-PDMS), and an aqueous phase containing excessive amounts of bisphenol A and sodium hydroxide, followed by the isolation of the organic phase.

(Alkali Washing, Acid Washing, and Water Washing (Step (C)))

The solution of the polycarbonate-polydimethylsiloxane copolymer (PC-PDMS) in methylene chloride thus obtained was sequentially washed with 0.03 mol/L aqueous sodium hydroxide and 0.2 mol/L hydrochloric acid in amounts of 15% by volume each with respect to the solution. Next, the solution was repeatedly washed with pure water so that an electric conductivity in an aqueous phase after the washing became 0.1 mS/m or less.

(Concentrating Step (Step (D)), Drying Step, and Granulating Step)

The solution of the PC-PDMS in methylene chloride thus obtained was concentrated [concentrating step], and was then pulverized and dried under reduced pressure at 120° C. [drying step]. The resultant flake was fed to an extruder and pelletized. At that time, a preset temperature was divided into four sections starting from a screw inlet portion, and the temperatures of the sections were 260° C., 270° C., 275° C., and 275° C., respectively, and the temperature of a die head was set to 270° C. [granulating step].

(Recovery and Distillation Purification of Methylene Chloride (Step (E)))

Meanwhile, methylene chloride separated in each of the concentrating step and the drying step was recovered in a 4.5-m$^3$ storage tank (MC storage tank). The concentration of the PC-PDMS in methylene chloride in the MC storage tank was 195 ppm by mass.

Next, methylene chloride recovered in the MC storage tank was introduced into the twentieth stage of a distillation column having 40 stages at 52 L/hr, and was purified by distillation at a column top temperature of 40° C., a column bottom temperature of 50° C., and a column top reflux ratio of 2.0. Methylene chloride was purified by distillation from the top of the column at a recovery ratio of 99.5%.

The following continuous driving was performed: the purified methylene chloride was introduced into the tubular reactor to be used in Synthesis Example 1 and as a reaction solvent in the step (A)-step (a-2), and was reused. During the continuous driving, the following operation was performed: the concentration of the PC-PDMS in the column bottom liquid of the distillation column was periodically measured, part of the column bottom liquid was taken out and methylene chloride after distillation purification was fed instead so that the concentration fell within the range of from 1 to 3% by mass. The concentration of the PC-PDMS in the column bottom liquid of the distillation column was around 2% by mass on average.

The concentration of carbon tetrachloride in methylene chloride in the MC storage tank after 720 hours of the continuous driving and the concentration of carbon tetrachloride in the resultant PC-PDMS pellet were measured.

Table 1 shows the results.

Example 2

The same operations were performed except that in Example 1, during the continuous driving, the following operation was performed: the concentration of the PC-PDMS in the column bottom liquid of the distillation column was periodically measured, part of the column bottom liquid was taken out and methylene chloride after distillation purification was fed instead so that the concentration fell within the range of from 3 to 5% by mass. The concentration of the PC-PDMS in the column bottom liquid of the distillation column was around 4% by mass on average.

Table 1 shows the results.

Example 3

The same operations were performed except that in Example 2, the supply amount of the 8% by mass solution of p-t-butylphenol (PTBP) in methylene chloride [13. PTBP/MC] to be added immediately in front of the reactor [2. Rx-2] after the cooling of the preliminary polymerization liquid that had exited the reactor [1. Rx-1] of the step (A)-step (a-2) with the heat exchanger to from 17 to 20° C. was changed to 1.8 kg/hr. The concentration of the PC-PDMS in the column bottom liquid of the distillation column was around 4% by mass on average.

Table 1 shows the results.

Comparative Example 1

Case where Methylene Chloride is Reused without being Purified by Distillation

In Example 1, the following continuous driving was performed: recovered methylene chloride was introduced into the tubular reactor to be used in Synthesis Example 1 and as a reaction solvent in the step (A)-step (a-2) without being purified by distillation, and was reused. The concentration of carbon tetrachloride in methylene chloride in the MC storage tank after 200 hours of the continuous driving and the concentration of carbon tetrachloride in the resultant PC-PDMS pellet were measured.

Table 1 shows the results.

Comparative Example 2

Case where Concentration of PC-PDMS in Column Bottom Liquid is not Controlled

The same operations were performed except that in Example 1, the concentration of the PC-PDMS in the column bottom liquid of the distillation column was not controlled. After 200 hours of the continuous driving, temperature control became difficult owing to a heat transfer failure at the bottom portion of the distillation column. Accordingly, the driving of the distillation column was stopped and the following continuous driving was performed: recovered methylene chloride was introduced into the tubular reactor to be used in Synthesis Example 1 and as a reaction solvent in the step (A)-step (a-2) without being purified by distillation, and was reused.

The concentration of carbon tetrachloride in methylene chloride in the MC storage tank after a total of 720 hours of the continuous driving and the concentration of carbon tetrachloride in the resultant PC-PDMS pellet were measured.

Table 1 shows the results.

Reference Example 1

Case of Continuous Production of Normal Polycarbonate-Based Resin

Continuous production of a polycarbonate was similarly performed except that in Example 1, the 20% by mass solution of an allylphenol terminal-modified polydimethylsiloxane in methylene chloride was not used in the "step (A)-step (a-2)", and during the continuous driving, the concentration of the PC in the column bottom liquid of the distillation column was not controlled. Even after 720 hours of the continuous driving, no trouble occurred in the distillation column.

The concentration of carbon tetrachloride in methylene chloride in the MC storage tank after 720 hours of the continuous driving and the concentration of carbon tetrachloride in the resultant polycarbonate pellet were measured.

Table 1 shows the results.

TABLE 1

|  | Example | | | Comparative Example | | Reference Example |
| --- | --- | --- | --- | --- | --- | --- |
|  | 1 | 2 | 3 | 1 | 2 | 1 |
| Presence or absence of distillation purification [step (E)] | Present | Present | Present | Absent | Present | Present |
| Concentration of PC-PDMS in column bottom liquid (% by mass) | 1 to 3 | 3 to 5 | 3 to 5 | — | 7 | 16[*1] |
| Concentration of $CCl_4$ in MC storage tank (ppm by mass) | 2 | 2 | 2 | 20 | 23 | 2 |
| Concentration of $CCl_4$ in PC-PDMS pellet (ppm by mass) | Less than 1 | Less than 1 | Less than 1 | 4 | 4 | Less than 1[*2] |
| Continuous driving time | 720 | 720 | 720 | 200 | 720 | 720 |

TABLE 1-continued

| | Example | | | Comparative Example | | Reference Example |
|---|---|---|---|---|---|---|
| | 1 | 2 | 3 | 1 | 2 | 1 |
| Amount of polydimethylsiloxane residue in PC-PDMS | 6 | 6 | 6 | 6 | 6 | 0 |
| Viscosity-average molecular weight of PC-PDMS (Mv) | 17,500 | 17,800 | 21,300 | 17,200 | 17,300 | 17,500 |

*[1]Concentration of PC in column bottom liquid (% by mass)
*[2]Concentration of CCl₄ in PC pellet (ppm by mass)

When recovered methylene chloride was reused without being purified by distillation like Comparative Example 1, the concentration of carbon tetrachloride in methylene chloride in the methylene chloride storage tank (MC storage tank) increased, and at the same time, the concentration of carbon tetrachloride in the PC-PDMS pellet became 4 ppm by mass or more.

In addition, when the concentration of the PC-PDMS in the column bottom liquid of the distillation column was not controlled like Comparative Example 2, after 200 hours of the continuous driving, temperature control became difficult owing to a heat transfer failure at the bottom portion of the distillation column, and hence the continuous driving could not be performed anymore and there was no choice but to stop the driving of the distillation column. In addition, it was found that the concentration of carbon tetrachloride in methylene chloride in the methylene chloride storage tank increased and the concentration of carbon tetrachloride in the resultant PC-PDMS also increased.

As compared to the foregoing, in each of Examples 1 to 3, the concentration of carbon tetrachloride in the PC-PDMS pellet can be maintained at less than 1 ppm by mass irrespective of long-term driving, and hence the examples are each found to be a method by which a high-quality PC-PDMS can be produced in an industrially stable manner.

It should be noted that as shown by the results of Reference Example 1, in the case of the production of a normal polycarbonate, an influence by the concentration of a polymer in the column bottom liquid of a distillation column was absent unlike the case of the production of a PC-PDMS, and hence even when the concentration of the PC in the column bottom liquid of the distillation column was 16% by mass, a heat transfer failure at the bottom portion of the distillation column did not occur and its continuous driving was able to be performed.

INDUSTRIAL APPLICABILITY

The polycarbonate-polydimethylsiloxane copolymer obtained by the present invention is expected to find utilization in various fields such as the field of electrical and electronic equipment and the field of an automobile. In particular, the polycarbonate-polydimethylsiloxane copolymer can be utilized as, for example, a material for the casing of a mobile phone, a mobile personal computer, a digital camera, a video camera, an electric power tool, or the like, or a material for other articles for daily use.

REFERENCE SIGNS LIST

1 to 4 reactor
5a, 5b mixer
6 solution of polycarbonate oligomer
7 methylene chloride
8 solution of allylphenol terminal-modified polydimethylsiloxane in methylene chloride
9 solution of triethylamine in methylene chloride
10a, 10b aqueous sodium hydroxide
11 aqueous solution of triethylamine
12 solution of bisphenol A in aqueous sodium hydroxide
13 solution of p-t-butylphenol in methylene chloride

The invention claimed is:
1. A polycarbonate-polyorganosiloxane copolymer having a carbon tetrachloride concentration of greater than 0 ppm by mass to less than 4 ppm by mass and having a repeating unit represented by formula (I) and a constituent unit represented by formula (II):

where:
R¹ and R² each independently represent a halogen atom, an alkyl group having 1 to 6 carbon atoms, or an alkoxy group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO₂—, —O—, or —CO—; and
a and b each independently represent an integer of 0 to 4;

where:
R³ to R⁶ each independently represent a hydrogen atom, a halogen atom, an alkyl group having 1 to 6 carbon atoms, an alkoxy group having 1 to 6 carbon atoms, or an aryl group having 6 to 12 carbon atoms;
Y represents a single bond or an organic residue including an aliphatic or aromatic moiety; and
n represents an average repetition number, the average repetition number n being 70 to 120.

2. The polycarbonate-polyorganosiloxane copolymer according to claim 1, wherein the copolymer has a viscosity-average molecular weight of 10,000 to 30,000.

3. The polycarbonate-polyorganosiloxane copolymer according to claim 1, wherein the carbon tetrachloride concentration is greater than 0 ppm by mass to less than 1 ppm by mass.

4. The polycarbonate-polyorganosiloxane copolymer according to claim 1, wherein the polycarbonate-polyorganosiloxane copolymer is obtained by interfacial polymerization.

5. The polycarbonate-polyorganosiloxane copolymer according to claim 1, wherein a content of the constituent unit represented by formula (II) in the polycarbonate-polyorganosiloxane copolymer is 1 to 25% by mass.

6. The polycarbonate-polyorganosiloxane copolymer according to claim 1, wherein the average repetition number n in the constituent unit represented by formula (II) is 70 to 100.

* * * * *